(12) United States Patent
Wang et al.

(10) Patent No.: US 12,112,524 B2
(45) Date of Patent: Oct. 8, 2024

(54) IMAGE AUGMENTATION METHOD, ELECTRONIC DEVICE AND READABLE STORAGE MEDIUM

(71) Applicant: HON HAI PRECISION INDUSTRY CO., LTD., New Taipei (TW)

(72) Inventors: Wei-Chun Wang, New Taipei (TW); Guo-Chin Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 364 days.

(21) Appl. No.: 17/828,288

(22) Filed: May 31, 2022

(65) Prior Publication Data

US 2023/0298326 A1    Sep. 21, 2023

(30) Foreign Application Priority Data

Mar. 16, 2022   (CN) .......................... 202210260018.X

(51) Int. Cl.
| | |
|---|---|
| *G06V 10/776* | (2022.01) |
| *G06V 10/28* | (2022.01) |
| *G06V 10/74* | (2022.01) |
| *G06V 10/77* | (2022.01) |
| *G06V 10/774* | (2022.01) |
| *G06V 10/82* | (2022.01) |

(52) U.S. Cl.
CPC ............ *G06V 10/776* (2022.01); *G06V 10/28* (2022.01); *G06V 10/761* (2022.01); *G06V 10/7715* (2022.01); *G06V 10/774* (2022.01); *G06V 10/82* (2022.01)

(58) Field of Classification Search
CPC .... G06V 10/776; G06V 10/28; G06V 10/761; G06V 10/7715; G06V 10/774; G06V 10/82; G06V 10/454
USPC ....................................................... 382/157
See application file for complete search history.

(56) References Cited

U.S. PATENT DOCUMENTS

| | | | |
|---|---|---|---|
| 2018/0341859 A1* | 11/2018 | Araujo ................... G06N 20/00 |
| 2021/0319265 A1* | 10/2021 | Fang ..................... G06V 10/764 |
| 2023/0177726 A1* | 6/2023 | Spears ...................... G06T 7/90 |
| | | | 382/100 |

FOREIGN PATENT DOCUMENTS

CN          109522819          3/2019

* cited by examiner

*Primary Examiner* — Huy C Ho
(74) *Attorney, Agent, or Firm* — ScienBiziP, P.C.

(57) ABSTRACT

An image augmentation method applied to an electronic device is provided. The method includes constructing a variational learner and a discriminator based on a fully convolutional neural network. A target image is obtained by inputting a gas leakage image into the variational learner. A variational autoencoder model is obtained by training the variational learner based on a discrimination result of the discriminator on the target image. A reconstruction accuracy rate is calculated based on a test image, an augmented model is obtained by adjusting the variational autoencoder model based on the gas leakage image, in response that the reconstruction accuracy rate being less than a preset threshold; and an augmented image is obtained by inputting the image to be augmented into the augmented model.

20 Claims, 3 Drawing Sheets

IMAGE AUGMENTATION METHOD, ELECTRONIC DEVICE AND READABLE STORAGE MEDIUM

FIELD

The present disclosure relates to image processing technology, in particular to an image augmentation method, an electronic device, and a readable storage medium.

BACKGROUND

In a current image augmentation method, when a variational autoencoder is used, a size of an input image needs to be considered and a reconstructed image is relatively blurred, which results in a low reconstruction accuracy. Therefore, how to construct a clear augmented image without considering the size of the input image become an urgent problem to be solved.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
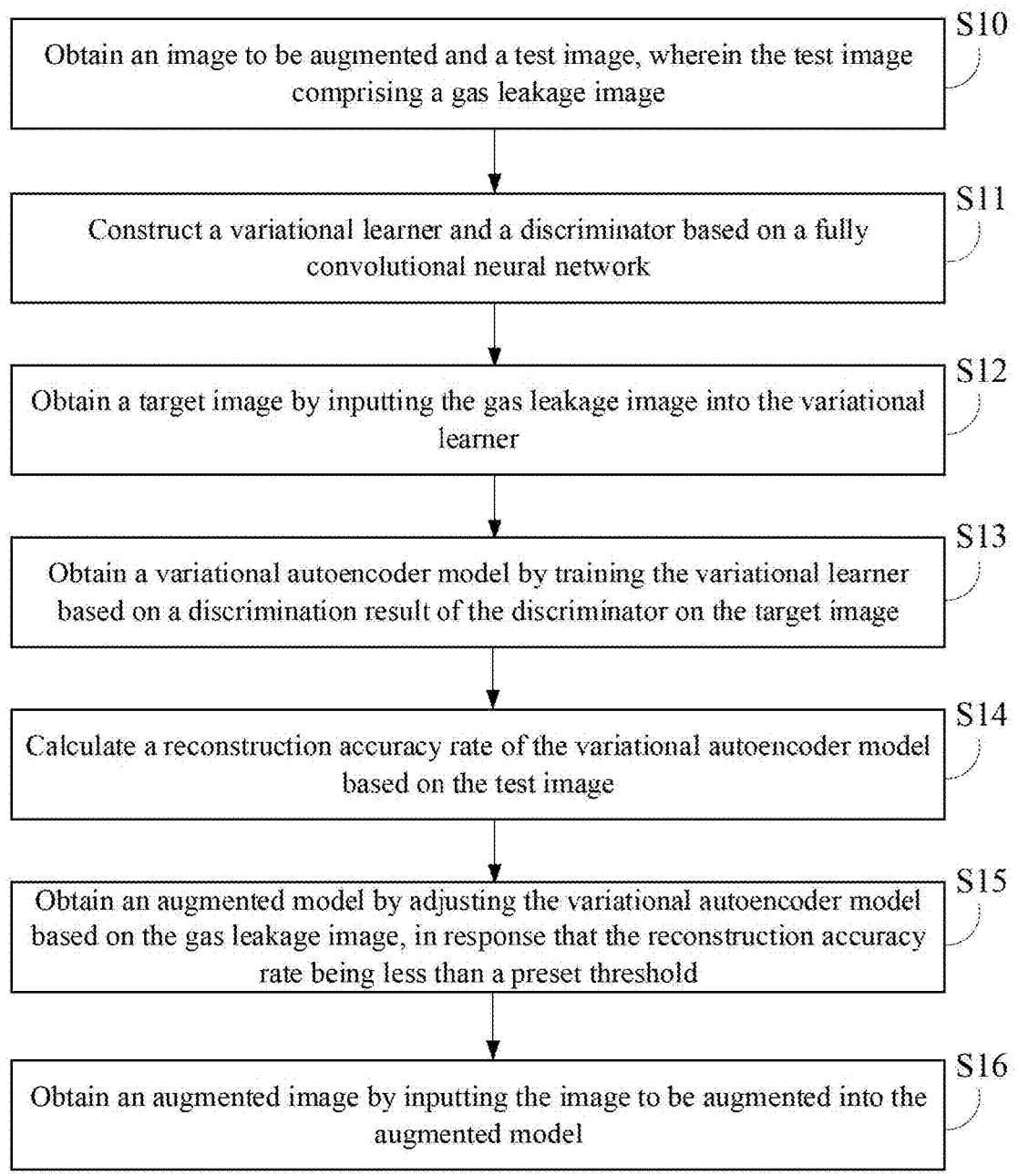
FIG. 1 is a flowchart of one embodiment of the image augmentation method of the present disclosure.

FIG. 1 is a flowchart of one embodiment of an image augmentation method of the present disclosure. According to different requirements, a sequence of each block in this flowchart can be adjusted according to actual requirements, and some blocks can be omitted. The execution body of this method can be an electronic device, such as an electronic device 1 shown in FIG. 4.

The image augmentation method can be applied to one or more electronic devices 1. The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable devices, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

At block S10, the electronic device obtains an image to be augmented and a test image, wherein the test image includes a gas leakage image.

In at least one embodiment, the test image can be used to calculate a reconstruction accuracy rate of a variational autoencoder model, and the electronic device can acquire the test image from a preset first database.

In at least one embodiment, the gas leakage image refers to an image showing or including gas which is leaking, and the gas in the gas leakage image may be chlorine gas, sulfur dioxide gas, etc. It can be understood that the gas leakage image may be an image of leaked chlorine gas, an image of leaked sulfur dioxide gas, etc., which may be used to train a variational learner.

In at least one embodiment, the image to be augmented refers to an image that does not show gas leakage, and the electronic device may acquire the image to be augmented from a preset second database.

At block S11, the electronic device constructs a variational learner and a discriminator based on a fully convolutional neural network.

In at least one embodiment, the variational learner may be used to reconstruct images.

In at least one embodiment, the discriminator is used to determine whether an input image is generated by the variational learner.

In at least one embodiment, the variational learner includes an encoding network and a decoding network, and the electronic device constructs the variational learner based on the fully convolutional neural network by:

Constructing four hidden layers as the encoding network, wherein each hidden layer includes a convolution layer and a first activation function layer; constructing four operation layers as the decoding network, wherein each operation layer includes a deconvolution layer and the first activation function layer.

In at least one embodiment, the electronic device constructs the discriminator by:

Constructing four deep convolutional network layers and a second activation function layer as the discriminator, wherein the first three deep convolutional network layers of the four deep convolutional network layers includes a convolutional layer, a batch normalization layer and the first activation function layer, the fourth deep convolutional network layer of the four deep convolutional network layers includes a convolutional layer and the second activation function layer.

Figure 2:
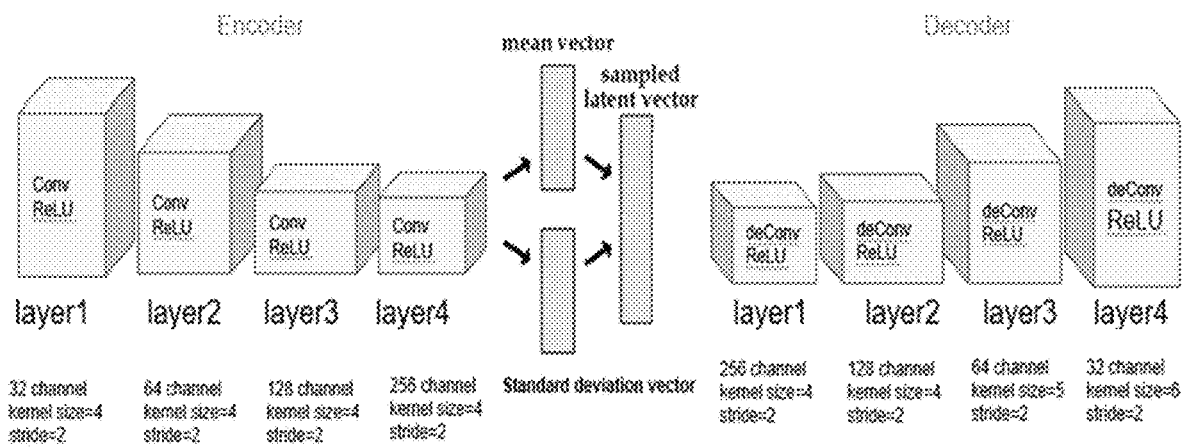
FIG. 2 is a schematic structural diagram of a variational learner according to one embodiment of the image augmentation method of the present disclosure.

As shown in FIG. 2, it is a schematic structural diagram of a variational learner according to one embodiment of the image augmentation method of the present disclosure. Parameters of the encoder network (Encoder) in FIG. 2 are set as follows: for the first convolutional layer, a number of filters (Channel) in the first convolutional layer is set to 32, a size of the filter (kernel size) is set to 4×4 pixels, and a size of stride is set to 2 pixels; for the second convolutional layer, a number of filters in the second convolutional layer is set to 64, a size of the filter is set to 4×4 pixels, a size of stride is set to 2 pixels; for the third convolutional layer, a number of filters in the third convolutional layers is set to 128, a size of the filter is set to 4×4 pixels, a size of stride is set to 2 pixels; for the fourth convolutional layer, a number of filters in the fourth convolutional layer is set to 256, a size of the filter is set to 4×4 pixels, a size of stride is set to 2 pixels; all the activation functions are ReLu. Parameters of the decoding network (Decoder) in FIG. 2 are set as follows: for the first deconvolution layer, a number of filters in the first deconvolution layer is set to 256, a size of the filter is set to 4×4 pixels, and a size of stride is set to 2 pixels; for the second deconvolution layer, a number of filters in the second deconvolution layer is set to 128, a size of the filter is set to 4×4 pixels, and a size of stride is set to 2 pixels; for the third deconvolution layer, a number of filters in the third deconvolution layer is set to 64, a size of the filter is set to 5×5 pixels, a size of stride is set to 2 pixels; for the fourth deconvolution layer, a number of filters in the fourth deconvolution layer is set to 32, a size of the filter is set to 6×6 pixels, a size of stride is set to 2 pixels, and all activation functions are ReLu.

Figure 3:
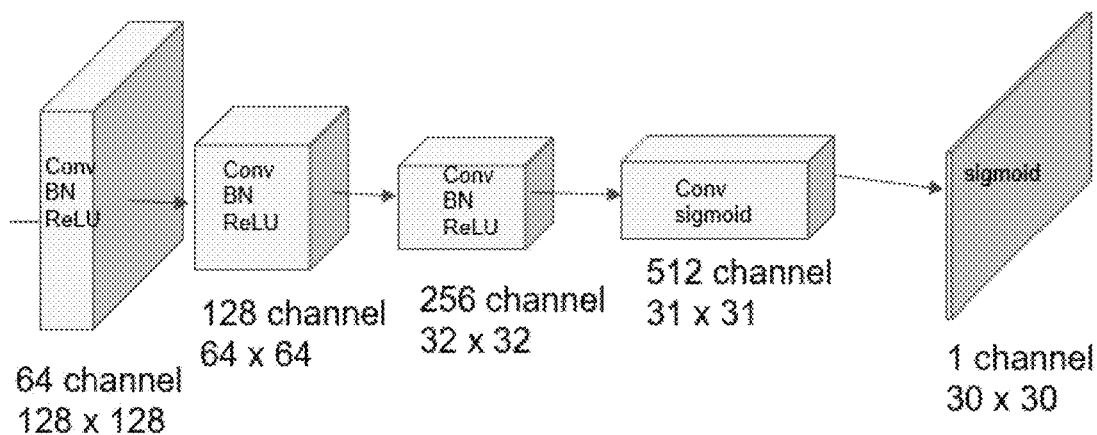
FIG. 3 is a schematic structural diagram of a discriminator of one embodiment of the image augmentation method of the present disclosure.

As shown in FIG. 3, FIG. 3 is a schematic structural diagram of a discriminator of one embodiment of the image augmentation method of the present disclosure. The parameters of each layer of the discriminator as shown in FIG. 3 are set as follows: for the first deep convolutional network layer, a number of filters in the first deep convolutional network layer is set to 64, a size of the filter is set to 128×128 pixels, and the BN layer and the ReLu activation function are added; for the second deep convolutional network layer, a number of filters in the second deep convolutional network layer is set to 128, a size of the filter is set to 64×64 pixels, the BN layer and the ReLu activation function are added; for the third deep convolutional network layer, a number of filters in the third deep convolutional network layer is set to 256, a size of the filter is set to 32×32 pixels, the BN layer and the ReLu activation function are added; for the fourth deep convolutional network layer, a number of filters in the fourth deep convolutional network layer is set to 512, a size of the filter is set to 31×31 pixels, a sigmoid activation function is added, the sigmoid activation function is used in the last layer.

Through the above embodiments, the variational learner can be constructed based on a fully convolutional neural network, so that the variational learner can extract features from an image of any size which is input (hereinafter named as "input image").

At block S12, the electronic device obtains a target image by inputting the gas leakage image into the variational learner.

In at least one embodiment, the target image refers to an image containing features of gas of the gas leakage image.

The process of generating the target image is the same as the process of generating the augmented image below, so not repeated here.

At block S13, the electronic device obtains a variational autoencoder model by training the variational learner based on a discrimination result of the discriminator on the target image.

In at least one embodiment, the variational autoencoder model refers to a model obtained by training the variational learner using the gas leakage image, and the variational autoencoder model can be used to generate an image including the features of gas of the gas leak image.

In at least one embodiment, the obtaining of variational autoencoder model by training the variational learner based on the discrimination result of the discriminator on the target image includes:

Obtaining a probability that the target image is a false image by inputting the target image into the discriminator; obtaining a first image by re-inputting the target image into the variational learner for training when the probability is greater than or equal to a first preset value; and obtaining the variational autoencoder model by calculating a loss value of the variational learner based on the gas leakage image, the target image, and the first image, and updating a weight value of the variational learner using gradient backpropagation until the loss value decreases to a minimum value.

The first preset value may be set according to requirements, which is not limited in this disclosure.

The false image refers to an image generated by the variational learner.

Specifically, the electronic device calculates the loss value of the variational learner according to the following formula based on the gas leakage image, the target image, and the first, image:

The formula is:

$$\text{loss} = \frac{1}{M*N}\sum_{i=1}^{M}\sum_{j=1}^{N}(y_i - x_j)^2 + \frac{1}{M*K}\sum_{r=1}^{K}\sum_{i=1}^{M}(z_r - y_i)^2;$$

Wherein, "loss" represents the loss value, "M" represents a number of all pixels in the target image, "N" represents a number of all pixels in the gas leakage image, and "K" represents a number of all pixels in the first image, "i" represents the ith pixel in the target image, "j" represents the pixel corresponding to "i" in the gas leakage image, and "r" represents the pixel corresponding to "i" in the first image, "$y_i$" represents a pixel value of the ith pixel in the target image, "$x_j$" represents a pixel value of the jth pixel in the gas leakage image, and "$z_r$" represents a pixel value of the rth pixel in the first image.

Through the above-mentioned implementation, the target image is discriminated by the discriminator to obtain the probability, and the target image corresponding to the probability being greater than or equal to the first preset value is re-input into the variational learner for training to obtain the first image, thus the training data of the variational learner is increased, so that the variational autoencoder model can learn the features of the gas leakage images, accordingly the reconstruction ability of the variational autoencoder model is improved.

At block S14, the electronic device calculates a reconstruction accuracy rate of the variational autoencoder model based on the test image.

In at least one embodiment, the reconstruction accuracy rate refers to an accuracy rate of the variational autoencoder model detects the test image.

In at least one embodiment, the calculating of the reconstruction accuracy rate of the variational autoencoder model based on the test image includes:

Obtaining an annotation result of the test image; obtaining a feature image by inputting the test image into the variational autoencoder model; calculating a similarity value between the feature image and the test image; obtaining a verification result of the test image by comparing the similarity value with a second preset value; comparing the verification result with the annotation result; and determining the test image as a second image when the verification result of the test image is the same as the annotation result of the test image, and determining the feature image corresponding to the second image as being a similar image, and calculating a proportion of the similar image in the feature image, and determining the proportion as the reconstruction accuracy rate.

Wherein, the annotation result of the test image includes that the test image contains the features of gas or the test image does not contain the features of gas.

The second preset value can be set according to requirements, which is not limited in this disclosure.

Specifically, the calculating of the similarity value between the feature image and the test image includes:

Obtaining a grayscale image by performing a grayscale processing on the feature image; obtaining a third image by performing binarization processing on the grayscale image; obtaining a fourth image by performing the grayscale processing and binarization processing on the test image corresponding to the feature image; calculating the similarity value between the third image and the fourth image; and determining the calculated similarity value as the similarity value between the feature image and the test image.

Specifically, the obtaining of the verification result of the test image by comparing the similarity value with the second preset value includes:

Determining that the test image contains the features of gas when the similarity value is greater than or equal to the second preset value; and determining that the test image does not contain the features of gas when the similarity value is smaller than the second preset value.

The similarity value is calculated according to the following formula:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c^2)};$$

$$c_1 = (K_1 L)^2;$$

$$c_2 = (K_2 L)^2;$$

Wherein, "SSIM(x, y)" represents the similarity value, "x" represents the third image, "y" represents the fourth image, "$\mu_x$" represents an average of grayscale value of the third image, "$\mu_y$" represents an average of grayscale value of the fourth image, "$\sigma_x$" represents a grayscale standard deviation of the third image. "$\sigma_y$" represents a grayscale standard deviation of the fourth image, "$\sigma_{xy}$" represents a grayscale covariance between the third image and the fourth image, "$c_1$" and "$c_2$" both represent preset parameters. "L" represents a largest pixel value in the fourth image, "$K_1$" and "$K_2$" both represent preset constants, and $K_1 < 1$, $K_2 < 1$.

Through the above implementation manner, the test image and the feature image are respectively subjected to grayscale and binarization processing, so that the difference of pixel value between different pixels in the third image and the fourth image is more obvious, and it is convenient to calculate the similarity value between the third image and the fourth image, and by comparing the similarity value with the second preset value, the feature image that is sufficiently similar to the test image can be accurately selected as the similar image, and the reconstruction accuracy rate of the variational autoencoder model can be accurately calculated according to the similar image.

At block S15, if the reconstruction accuracy rate is less than a preset threshold, the electronic device obtains an augmented model by adjusting the variational autoencoder model based on the gas leakage image.

In at least one embodiment, the preset threshold may include, but is not limited to: 0.8, 0.9.

The augmented model refers to a variational autoencoder model whose reconstruction accuracy rate is greater than or equal to the preset threshold. The augmented model includes an encoder and a decoder, the encoder is generated by training the encoding network according to the gas leakage image, and the decoder is generated by training the decoding network based on the gas leakage image.

In at least one embodiment, the obtaining of the augmented model by adjusting the variational autoencoder model based on the gas leakage image includes:

obtaining the augmented model by inputting the gas leakage image into the variational autoencoder model for training, until the reconstruction accuracy rate is greater than or equal to the preset threshold.

Wherein, the adjusting of the variational autoencoder model includes inputting the gas leakage image into the variational autoencoder model for training, until the reconstruction accuracy rate is greater than or equal to the preset threshold, the augmented model is obtained.

Through the above-mentioned embodiments, the variational autoencoder corresponding to the reconstruction accuracy rate smaller than the preset threshold value can be adjusted, so that the reconstruction accuracy rate of the augmented model can be improved.

At block S16, the electronic device obtains the augmented image by inputting the image to be augmented into the augmented model.

In at least one embodiment, the augmented image refers to a reconstructed image that includes the features of gas in the gas leakage image. The augmented model includes the encoder and the decoder, the encoder adopts the full convolutional neural network, the full convolutional neural network includes a plurality of hidden layers, and the decoder adopts a deconvolutional neural network, and the deconvolutional neural network includes a plurality of operation layers.

In at least one embodiment, the obtaining of the augmented image by inputting the image to be augmented into the augmented model includes:

Extracting a feature vector by inputting the image to be augmented into the hidden layer of the encoder, wherein there are 2n elements in the feature vector; extracting the first n elements in the feature vector as a mean vector; extracting the last n elements in the feature vector as a standard deviation vector; generating a gaussian random number according to the mean vector and the standard deviation vector; obtaining a sampling value by performing random sampling on the gaussian random number; obtaining a plurality of multiplication results by performing multiplication on each element in the mean value vector with the sampling value; obtaining latent vectors by performing addition operation on each of the plurality of multiplication results with the corresponding element in the standard deviation vector; and obtaining the augmented image by inputting the latent vectors to the operation layer of the decoder for mapping processing.

Wherein, the gaussian random number can be generated by using the Box-Muller algorithm according to the mean vector and the standard deviation vector.

Through the above-mentioned embodiment, the image to be augmented can be compressed into the latent vector by using the augmented model, and the noise in the image to be augmented is filtered during the compression process, so that the augmented image is clearer, since the augmented model learns the features of gas of the gas leakage image, and the reconstruction accuracy rate is high, the augmented model can accurately reconstruct a clear image including the features of gas.

It can be seen from the above technical solutions that the variational learner constructed in this disclosure adopts the structure of a fully convolutional neural network, which can not only accept input images of any size, but also better extract the features of the images to be augmented, such that the problem that the size of the input image is not suitable is solved. The target image is obtained by inputting the gas leakage image into the variational learner, and the variational learner is trained according to the discrimination result of the discriminator on the target image, and the variational autoencoder model is obtained. Only when the target image is clear enough, the training of the variational learner using the discrimination result is stopped, so that the clarity of the image generated by the variational autoencoder model can be improved. Further, by calculating the reconstruction accuracy rate of the variational autoencoder model in the test image, the reconstruction accuracy rate is compared with the preset threshold to determine whether to adjust the variational autoencoder model, to improve the reconstruction accuracy rate of the augmented model, so that the augmented model can accurately reconstruct a clear augmented image.

Figure 4:
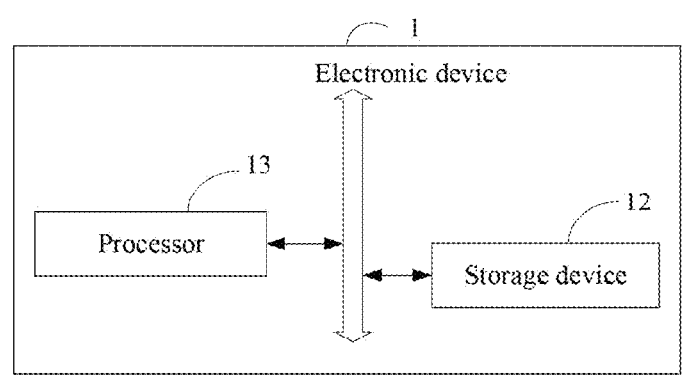
FIG. 4 is a schematic structural diagram of one embodiment of an electronic device implementing the image augmentation method of the present disclosure.

As shown in FIG. 4, it is a schematic structural diagram of an electronic device according to one embodiment of the image augmentation method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of image augmentation.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the foregoing image augmentation method, for example, implement each block shown in FIG. 1.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, disk, removable hard disk, magnetic disk, optical disk, computer memory, read-only memory (ROM).

With reference to FIG. 1, the storage device 12 in the electronic device 1 stores a plurality of instructions to implement the image augmentation method, and the processor 13 can acquire the plurality of instructions to implement: acquiring the image to be augmented and the test image, wherein the test image includes a gas leakage image; constructing a variational learner and a discriminator based on a full convolutional neural network; inputting the gas leakage image into the variational learner to obtain a target image; training the variational learner according to a discrimination result of the discriminator on the target image to obtain a variational autoencoder model; calculating the reconstruction accuracy rate of the variational autoencoder model based on the test image; if the reconstruction accuracy rate is less than a preset threshold, obtaining an augmented model by adjusting the variational autoencoder model based on the gas leakage image; and inputting the image to be augmented into the augmented model to obtain the augmented image.

Specifically, for the specific implementation method of the above-mentioned instruction by the processor 13, reference may be made to the description of the relevant blocks in the corresponding embodiment of FIG. 1, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image augmentation method applied to an electronic device, the method comprising:
   obtaining an image to be augmented and a test image, the test image comprising a gas leakage image;
   constructing a variational learner and a discriminator based on a fully convolutional neural network;
   obtaining a target image by inputting the gas leakage image into the variational learner;
   obtaining a variational autoencoder model by training the variational learner based on a discrimination result of the discriminator on the target image;
   calculating a reconstruction accuracy rate of the variational autoencoder model based on the test image;
   obtaining an augmented model by adjusting the variational autoencoder model based on the gas leakage image, in response that the reconstruction accuracy rate is less than a preset threshold; and
   obtaining an augmented image by inputting the image to be augmented into the augmented model.

2. The image augmentation method according to claim 1, wherein the obtaining of variational autoencoder model by training the variational learner based on the discrimination result of the discriminator on the target image comprises:
   obtaining a probability that the target image is a false image by inputting the target image into the discriminator;
   obtaining a first image by re-inputting the target image into the variational learner for training in response that the probability is greater than or equal to a first preset value;
   obtaining the variational autoencoder model by calculating a loss value of the variational learner based on the gas leakage image, the target image, and the first image; and
   updating a weight value of the variational learner using gradient backpropagation until the loss value decreases to a minimum value.

3. The image augmentation method according to claim 2, further comprising:
   calculating the loss value of the variational learner based on the gas leakage image, the target image, and the first image according to a formula:

$$\text{loss} = \frac{1}{M*N}\sum_{i=1}^{M}\sum_{j=1}^{N}(y_i - x_j)^2 + \frac{1}{M*K}\sum_{r=1}^{K}\sum_{i=1}^{M}(z_r - y_i)^2;$$

wherein, "loss" represents the loss value, "M" represents a number of all pixels in the target image, "N" represents a number of all pixels in the gas leakage image, and "K" represents a number of all pixels in the first image, "i" represents the ith pixel in the target image, "j" represents the pixel corresponding to "i" in the gas leakage image, and "r" represents the pixel corresponding to "i" in the first image "$y_i$" represents a pixel value of the ith pixel in the target image, "$x_j$" represents a pixel value of the jth pixel in the gas leakage image, "$z_r$" represents a pixel value of the rth pixel in the first image.

4. The image augmentation method according to claim 1, wherein the calculating of the reconstruction accuracy rate of the variational autoencoder model based on the test image comprises:
   obtaining an annotation result of the test image;
   obtaining a feature image by inputting the test image into the variational autoencoder model;
   calculating a similarity value between the feature image and the test image;
   obtaining a verification result of the test image by comparing the similarity value with a second preset value;

comparing the verification result with the annotation result;

determining the test image as a second image when the verification result of the test image is the same as the annotation result of the test image;

determining the feature image corresponding to the second image as a similar image; and calculating a proportion of the similar image in the feature image, and determining the proportion as the reconstruction accuracy rate.

5. The image augmentation method according to claim 4, wherein the calculating of the similarity value between the feature image and the test image comprises:

obtaining a grayscale image by performing a grayscale processing on the feature image;

obtaining a third image by performing binarization processing on the grayscale image;

obtaining a fourth image by performing the grayscale processing and binarization processing on the test image corresponding to the feature image;

calculating the similarity value between the third image and the fourth image; and determining the calculated similarity value as the similarity value between the feature image and the test image.

6. The image augmentation method according to claim 5, wherein the similarity value between the third image and the fourth image is calculated according to a formula:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c^2)};$$

$$c_1 = (K_1 L)^2;$$

$$c_2 = (K_2 L)^2;$$

wherein, "SSIM(x, y)" represents the similarity value, "x" represents the third image, "y" represents the fourth image, "$\mu_x$" represents an average of grayscale value of the third image, "$\mu_y$" represents an average of grayscale value of the fourth image, "$\sigma_x$" represents a grayscale standard deviation of the third image, "$\sigma_y$" represents a grayscale standard deviation of the fourth image, "$\sigma_{xy}$" represents a grayscale covariance between the third image and the fourth image, "$c_1$" and "$c_2$" both represent preset parameters, "L" represents a largest pixel value in the fourth image, "$K_1$" and "$K_2$" both represent preset constants, and $K_1 < 1$, $K_2 < 1$.

7. The image augmentation method according to claim 1, wherein the obtaining of the augmented model by adjusting the variational autoencoder model based on the gas leakage image comprises:

obtaining the augmented model by inputting the gas leakage image into the variational autoencoder model for training, until the reconstruction accuracy rate being greater than or equal to the preset threshold.

8. The image augmentation method according to claim 1, wherein the augmented model comprises an encoder and a decoder, the encoder adopts a full convolutional neural network, the full convolutional neural network comprises a plurality of hidden layers, and the decoder adopts a deconvolutional neural network, and the deconvolutional neural network comprises a plurality of operation layers.

9. The image augmentation method according to claim 8, wherein the obtaining of the augmented image by inputting the image to be augmented into the augmented model comprises:

extracting a feature vector by inputting the image to be augmented into the hidden layer of the encoder, wherein there are 2n elements in the feature vector;

extracting the first n elements in the feature vector as a mean vector;

extracting the last n elements in the feature vector as a standard deviation vector;

generating a gaussian random number according to the mean vector and the standard deviation vector;

obtaining a sampling value by performing random sampling on the gaussian random number;

obtaining a plurality of multiplication results by performing multiplication on each element in the mean value vector with the sampling value;

obtaining latent vectors by performing addition operation on each of the plurality of multiplication results with the corresponding element in the standard deviation vector; and obtaining the augmented image by inputting the latent vectors to the operation layer of the decoder for mapping processing.

10. An electronic device comprising:

a storage device;

at least one processor; and the storage device storing one or more programs, which when executed by the at least one processor, cause the at least one processor to:

obtain an image to be augmented and a test image, the test image comprising a gas leakage image;

construct a variational learner and a discriminator based on a fully convolutional neural network;

obtain a target image by inputting the gas leakage image into the variational learner;

obtain a variational autoencoder model by training the variational learner based on a discrimination result of the discriminator on the target image;

calculate a reconstruction accuracy rate of the variational au ° encoder model based on the test image;

obtain an augmented model by adjusting the variational autoencoder model based on the gas leakage image, in response that the reconstruction accuracy rate is less than a preset threshold; and obtain an augmented image by inputting the image to be augmented into the augmented model.

11. The electronic device according to claim 10, wherein the obtaining of variational autoencoder model by training the variational learner based on the discrimination result of the discriminator on the target image comprises:

obtaining a probability that the target image is a false image by inputting the target image into the discriminator;

obtaining a first image by re-inputting the target image into the variational learner for training in response that the probability is greater than or equal to a first preset value;

obtaining the variational autoencoder model by calculating a loss value of the variational learner based on the gas leakage image, the target image, and the first image; and updating a weight value of the variational learner using gradient backpropagation until the loss value decreases to a minimum value.

12. The electronic device according to claim 10, wherein the at least one processor is further caused to:

calculate the loss value of the variational learner based on the gas leakage image, the target image, and the first image according to a formula:

$$\text{loss} = \frac{1}{M*N}\sum_{i=1}^{M}\sum_{j=1}^{N}(y_i - x_j)^2 + \frac{1}{M*K}\sum_{r=1}^{K}\sum_{i=1}^{M}(z_r - y_i)^2;$$

wherein, "loss" represents the loss value, "M" represents a number of all pixels in the target image, "N" represents a number of all pixels in the gas leakage image, and "K" represents a number of all pixels in the first image, "i" represents the ith pixel in the target image, "j" represents the pixel corresponding to "i" in the gas leakage image, and "r" represents the pixel corresponding to "i" in the first image, "$y_i$" represents a pixel value of the ith pixel in the target image, "$x_j$" represents a pixel value of the jth pixel in the gas leakage image, "$z_r$" represents a pixel value of the rth pixel in the first image.

13. The electronic device according to claim 10, wherein the calculating of the reconstruction accuracy rate of the variational autoencoder model based on the test image comprises:
obtaining an annotation result of the test image;
obtaining a feature image by inputting the test image into the variational autoencoder model;
calculating a similarity value between the feature image and the test image;
obtaining a verification result of the test image by comparing the similarity value with a second preset value;
comparing the verification result with the annotation result;
determining the test image as a second image when the verification result of the test image is the same as the annotation result of the test image;
determining the feature image corresponding to the second image as a similar image; and
calculating a proportion of the similar image in the feature image, and determining the proportion as the reconstruction accuracy rate.

14. The electronic device according to claim 13, wherein the calculating of the similarity value between the feature image and the test image comprises:
obtaining a grayscale image by performing a grayscale processing on the feature image;
obtaining a third image by performing binarization processing on the grayscale image;
obtaining a fourth image by performing the grayscale processing and binarization processing on the test image corresponding to the feature image;
calculating the similarity value between the third image and the fourth image; and
determining the calculated similarity value as the similarity value between the feature image and the test image.

15. The electronic device according to claim 14, wherein the similarity value between the third image and the fourth image is calculated according to a formula:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c^2)};$$

$$c_1 = (K_1 L)^2;$$

$$c_2 = (K_2 L)^2;$$

wherein, "SSIM(x, y)" represents the similarity value, "x" represents the third image, "y" represents the fourth image, "$\mu_x$" represents an average of grayscale value of the third image, "$\mu_y$" represents an average of grayscale value of the fourth image, "$\sigma_x$" represents a grayscale standard deviation of the third image, "$\sigma_y$" represents a grayscale standard deviation of the fourth image, "$\sigma_{xy}$" represents a grayscale covariance between the third image and the fourth image, "$c_1$" and "$c_2$" both represent preset parameters, "L" represents a largest pixel value in the fourth image, "$K_1$" and "$K_2$" both represent preset constants, and $K_1 < 1$, $K_2 < 1$.

16. The electronic device according to claim 10, wherein the obtaining of the augmented model by adjusting the variational autoencoder model based on the gas leakage image comprises:
obtaining the augmented model by inputting the gas leakage image into the variational autoencoder model for training, until the reconstruction accuracy rate being greater than or equal to the preset threshold.

17. The electronic device according to claim 10, wherein the augmented model comprises an encoder and a decoder, the encoder adopts a full convolutional neural network, the full convolutional neural network comprises a plurality of hidden layers, and the decoder adopts a deconvolutional neural network, and the deconvolutional neural network comprises a plurality of operation layers.

18. The electronic device according to claim 17, wherein the obtaining of the augmented image by inputting the image to be augmented into the augmented model comprises:
extracting a feature vector by inputting the image to be augmented into the hidden layer of the encoder, wherein there are 2n elements in the feature vector;
extracting the first n elements in the feature vector as a mean vector;
extracting the last n elements in the feature vector as a standard deviation vector;
generating a gaussian random number according to the mean vector and the standard deviation vector;
obtaining a sampling value by performing random sampling on the gaussian random number;
obtaining a plurality of multiplication results by performing multiplication on each element in the mean value vector with the sampling value;
obtaining latent vectors by performing addition operation on each of the plurality of multiplication results with the corresponding element in the standard deviation vector; and
obtaining the augmented image by inputting the latent vectors to the operation layer of the decoder for mapping processing.

19. A non-transitory storage medium having instructions stored thereon, when the instructions are executed by a processor of an electronic device, the processor is caused to perform an image augmentation method, wherein the method comprises:
obtaining an image to be augmented and a test image, the test image comprising a gas leakage image;
constructing a variational learner and a discriminator based on a fully convolutional neural network;
obtaining a target image by inputting the gas leakage image into the variational learner;
obtaining a variational autoencoder model by training the variational learner based on a discrimination result of the discriminator on the target image;
calculating a reconstruction accuracy rate of the variational autoencoder model based on the test image;
obtaining an augmented model by adjusting the variational autoencoder model based on the gas leakage image, in response that the reconstruction accuracy rate is less than a preset threshold; and obtaining an augmented image by inputting the image to be augmented into the augmented model.

20. The non-transitory storage medium according to claim 19, wherein the obtaining of variational autoencoder model by training the variational learner based on the discrimination result of the discriminator on the target image comprises:

obtaining a probability that the target image is a false image by inputting the target image into the discriminator;

obtaining a first image by re-inputting the target image into the variational learner for training in response that the probability is greater than or equal to a first preset value;

obtaining the variational autoencoder model by calculating a loss value of the variational learner based on the gas leakage image, the target image, and the first image; and updating a weight value of the variational learner using gradient backpropagation until the loss value decreases to a minimum value.

* * * * *